US006647507B1

(12) United States Patent
Dow

(10) Patent No.: US 6,647,507 B1
(45) Date of Patent: *Nov. 11, 2003

(54) METHOD FOR IMPROVING A TIMING MARGIN IN AN INTEGRATED CIRCUIT BY SETTING A RELATIVE PHASE OF RECEIVE/TRANSMIT AND DISTRIBUTED CLOCK SIGNALS

(75) Inventor: Keith E. Dow, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/476,976

(22) Filed: Dec. 31, 1999

(51) Int. Cl.[7] .............................. G06F 1/04; H02H 3/05; G01R 31/28
(52) U.S. Cl. ......................... 713/503; 714/36; 714/744
(58) Field of Search ...................... 713/503; 711/100; 714/36, 700, 702, 750, 744; 702/117

(56) References Cited

U.S. PATENT DOCUMENTS

| 4,648,064 A | | 3/1987 | Morley | |
|---|---|---|---|---|
| 4,694,472 A | * | 9/1987 | Torok et al. | 327/141 |
| 5,058,132 A | | 10/1991 | Li | |
| 5,357,195 A | * | 10/1994 | Gasbarro et al. | 324/158.1 |
| 5,857,095 A | * | 1/1999 | Jeddeloh et al. | 711/100 |
| 5,945,862 A | | 8/1999 | Donnelly et al. | |
| 5,987,576 A | | 11/1999 | Johnson et al. | |
| 6,049,846 A | | 4/2000 | Farmwald et al. | |
| 6,115,318 A | * | 9/2000 | Keeth | 74/135 |
| 6,324,485 B1 | * | 11/2001 | Ellis | 702/108 |

FOREIGN PATENT DOCUMENTS

| JP | 05101204 A | * | 4/1993 | G06F/15/78 |

OTHER PUBLICATIONS

James N. Sweet, Integated Test Chips Improve IC Assebmly, 1990, IEEE, pp. 39–45.*
Direct DRAM 64/72–Mbit (256Kx16/18x16d), Preliminary Information, Document DL0035 Version 1.0, Frederick A. Ware, RAMBUS Inc., May 1999, pp. 1–62.

* cited by examiner

Primary Examiner—Thomas Lee
Assistant Examiner—Surech K Suryawanshi
(74) Attorney, Agent, or Firm—Blakely, Sokoloff, Taylor & Zafman LLP

(57) ABSTRACT

An embodiment of the invention includes an apparatus that has a first clock on a memory controller hub that is set to a first clock receive time and a second clock on the memory controller hub set to a first clock transmit time. A first data is sent from the memory to the memory controller hub. A second data is sent from the memory to the memory controller hub wherein the second data is checked. At least one of the first clock and the second clock has at least one of a second clock receive time and a second clock transmit time adjusted.

16 Claims, 11 Drawing Sheets

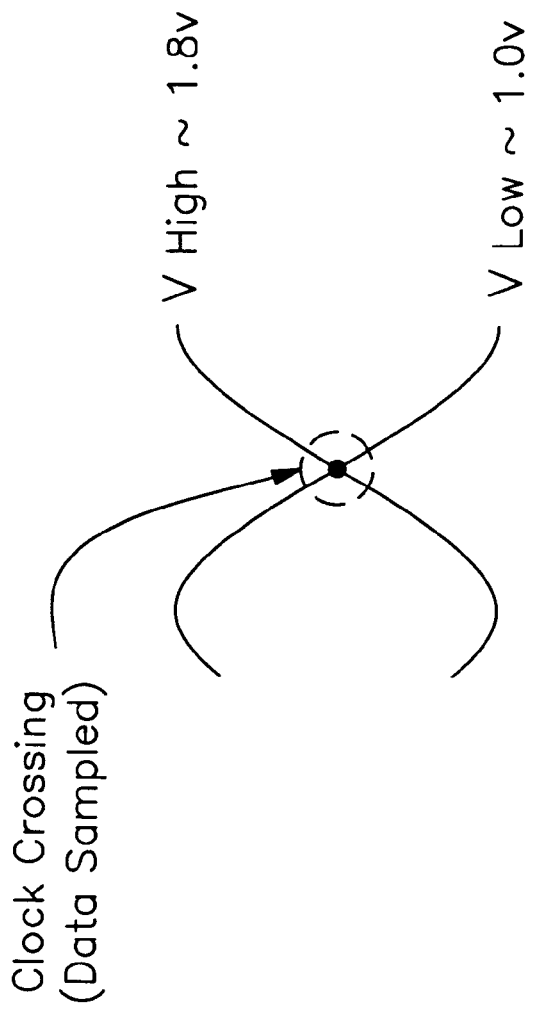

METHOD FOR IMPROVING A TIMING MARGIN IN AN INTEGRATED CIRCUIT BY SETTING A RELATIVE PHASE OF RECEIVE/TRANSMIT AND DISTRIBUTED CLOCK SIGNALS

BACKGROUND OF THE INVENTION

1. Field of the Invention

The invention relates generally to computers and more particularly to system boards and computer chips.

2. Background Information

Since the advent of computers, computer scientists and engineers have strived to make computers operate faster. One feature of the computer that has remained critical is the time that it takes for data to be transmitted from one component to another component located on the computer board. For example, data may be transferred from the memory to the processor. To transfer data at high speeds and with fidelity, the data transfer must be coordinated in time with the clock signals. Clock signals determine when a data signal is sent and received. If the data signal is sent too early or too late or if the data is received too early or too late, the data may become corrupt. This is commonly referred to as excess clock-data skew.

A computer board solution is not feasible because the correct receive clock time (RCLK) of data and the correct transmit clock time (TCLK) of data may vary depending upon the computer board manufacturing variation. Therefore, what is needed is a way of checking the timing of the signals on the computer board.

BRIEF DESCRIPTION OF THE DRAWINGS

FIG. 11 shows a clock crossing signal in accordance with one embodiment of the invention.

DETAILED DESCRIPTION OF THE INVENTION

The following detailed description and the accompanying drawings are provided for the purpose of describing and illustrating presently preferred embodiments of the invention only, and are not intended to limit the scope of the invention in any way.

One embodiment of the invention relates to two clocks located on the memory and two clocks located on the memory controller hub. The time to receive data (RCLK) and the time to transmit data (TCLK) for clock 1 and clock 2 on the memory are set to zero and RCLK and TCLK are automatically established for memory controller hub (MCH) at the optimum time periods after the configuration of the system board is checked. The information presented below provides a general to or more detailed description of various aspects of several embodiments of the invention.

Figure 1:
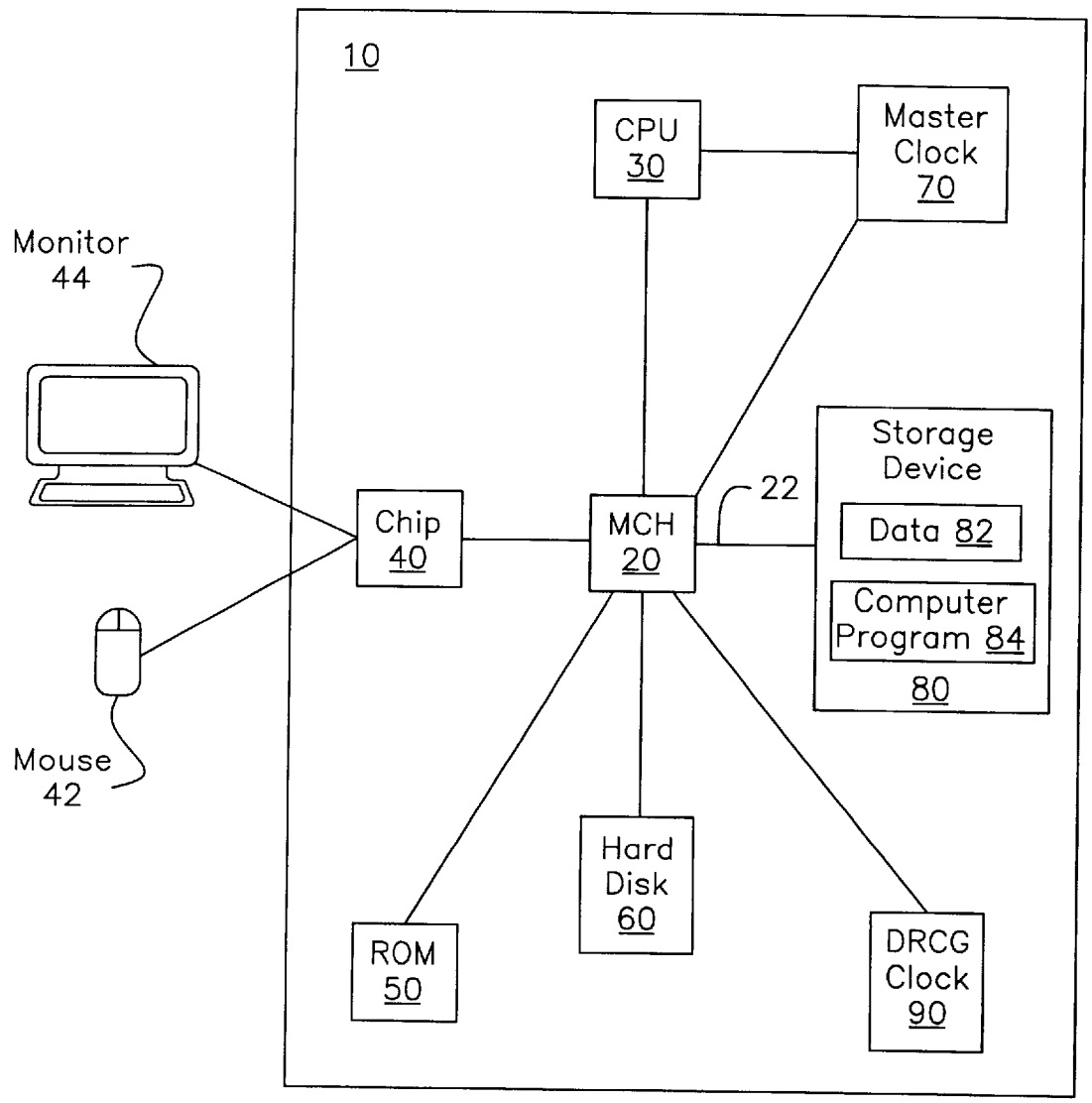
FIG. 1 is a block diagram illustrating a system board in accordance with one embodiment of the invention.

FIG. 1 is a block diagram illustrating a system board 10 of one embodiment of the invention. System board (e.g., computer board) 10 includes MCH 20 coupled to processor 30, master clock 70, storage device (or also referred to herein as memory) 80, direct Rambus clock generator such as a clock generator available from Rambus Inc. of Mountain View, Calif. (DRCG) clock 90, hard disk 60, read-only memory (ROM) 50, and chip 40. MCH 20 controls the data flow in system board 10.

Because MCH 20 and storage device 80 are devices that are more frequently used to describe the invention, these devices are described in greater detail followed by a brief description of the other devices on system board 10. MCH 20 is configured to send and receive data to and from storage device 80. Controller 20 generally operates such that memory MCH 20 sends a first data to storage device 80 wherein the first data is initially stored in a buffer. The first data is then returned from storage device 80 to MCH 20. Processor 30 then checks this second data against the first data it sent to storage device 80. If the second data is considered "good", then the data is considered to "pass" and the passing value assigned to the second data is "1". Data or the clock bias value (e.g.,) a clock bias generally exists when a normal clock pulse and an internal clock is shifted with respect to the time of the external clock) is considered "good" when the first data matches the second data. Data that is received from storage device 80 that is checked by processor 30 and determined to be not "good" data is set to zero and is subsequently used to help determine the RCLK and the TCLK for MCH 20. This operation is described in greater detail in FIGS. 3–4.

It will be appreciated that storage device 80 includes all types of memory such as storage device 80 may include read only memory (ROM), Synchronous dynamic random access memory (SDRAM), double data rate random access memory (DDRAM), magnetic disk storage mediums, optical storage mediums, flash memory devices, and/or other machine-readable mediums. Storage device 80 has stored therein data 82 and computer program 84. Data 82 represents data stored, for example, in one or more of the formats described herein. Computer program 84 represents the necessary code for performing any and/or all of the techniques described herein. It will be recognized by one of ordinary skill in the art that the storage device 80 preferably contains additional instruction logic (e.g., computer programs), which is not necessary to understanding the invention. Storage device 80 is coupled to MCH 20 through bus (or also referred to herein as a channel) 22. Preferably storage device 80 is a Rambus dynamic random access memory (RDRAM) manufactured by Rambus, Inc. of Mountain View, Calif., since RDRAM offers transfer rates of around 1000 megabits per second (Mbps).

The descriptions of the remaining devices on system board 10 are provided below. Processor 30 represents a central processing unit of any type of architecture, such as complex instruction set computer (CISC), reduced instruction set computer (RISC), very long instruction word (VLIW), or hybrid architecture. In addition, processor 30 could be implemented on one or more chips.

Chip 40 includes circuits that receive input from mouse 42 and control monitor 44.

Read-only memory (ROM) 50 is a type of data storage device that has computer program(s) and the contents of ROM 50 generally cannot be altered. Hard disk 60 may include one or more rigid magnetic disks divided into a number of evenly spaced concentric circular tracks that may be used to store information. Master clock 70 controls processor 30 and MCH 20. Additionally, master clock 70 is generally used to coordinate through clock cycles of each communication transported within system board 10. A clock cycle is used herein to describe one period of a computer clock.

DRCG clock 90 generally serves the purpose of controlling the timing between devices such as MCH 20 and storage device 80. DRCG clock 90 accomplishes this task by sending out clock pulses that oscillate back and forth. The clock pulses indicate that data will be transmitted. The clock pulses also trigger the time at which the data is sent between MCH 20 and storage device 80.

Figure 2:
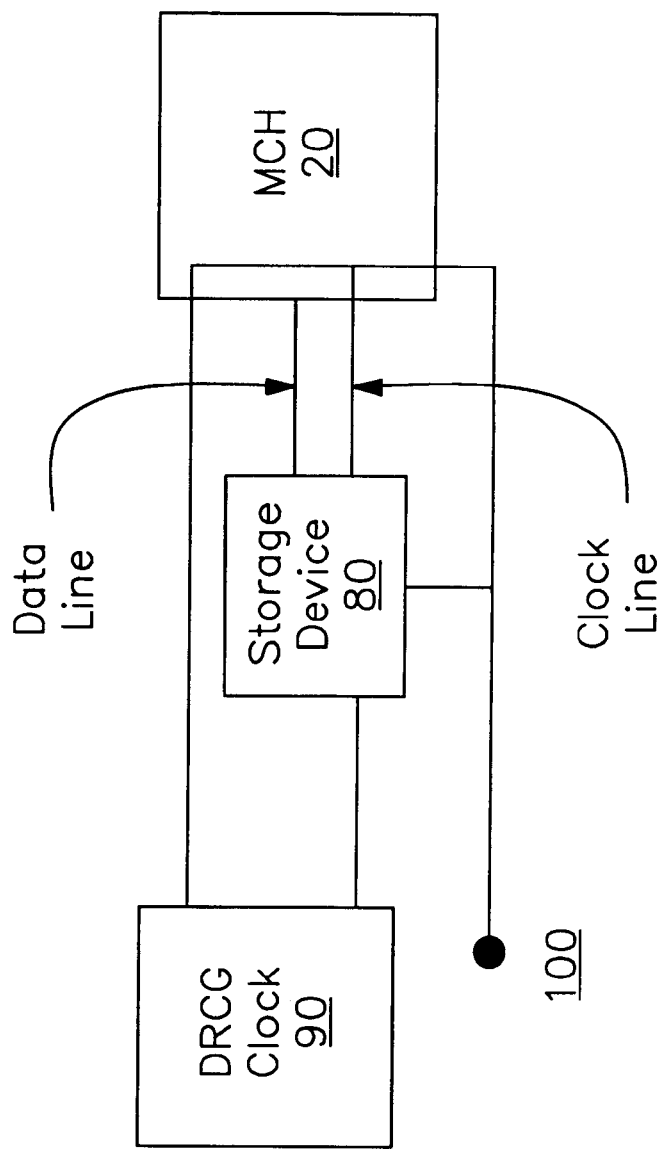
FIG. 2 is a block diagram illustrating the flow of data from the memory controller hub to the memory and the data flow from the memory to the memory controller hub in accordance with one embodiment of the invention.

In FIG. 2, MCH 20 is coupled to DRCG clock 90 and to storage device 80. It will be appreciated that each chip has at least two clocks: a clock 1 and at least a clock 2. DRGC clock 90 sends a clock signal to MCH 20 indicating that data is to be sent from MCH 20 which then goes to storage device 80 to indicate it will be receiving data. The clock signal then terminates at termination point 100. The clock signal is passively received by all chips and is used to determine RCLK and TCLK times. DRCG clock 90 then sends a second clock signal to MCH 20 indicating that MCH 20 must send the data to storage device 80.

In order to implement the techniques described herein to achieve synchronization of the clock signal and data transfer, the phase relationship between the clock and the data must be adjusted. There are at least two adjustments that occur in one embodiment of the invention. The first adjustment such as the TCLK adjustment occurs when data is sent from the memory to MCH 20. The second adjustment such as the RCLK adjustment occurs when the receiver of the data such as storage device 80 expects to receive the data.

In one embodiment of the invention, the clock bias for clock 1 and clock 2 of storage device 80 may be set to zero. Therefore, only TCLK and RCLK clock 1 and clock 2 on MCH 20 need to be adjusted or changed. However, it will be appreciated that RCLK and TCLK may be adjusted on a variety of devices such as RDRAM. In this case, clock 1 and clock 2 on MCH 20 is set to zero and RCLK and TCLK are for each RDRAM is adjusted.

TCLK Adjustment

Figure 3:
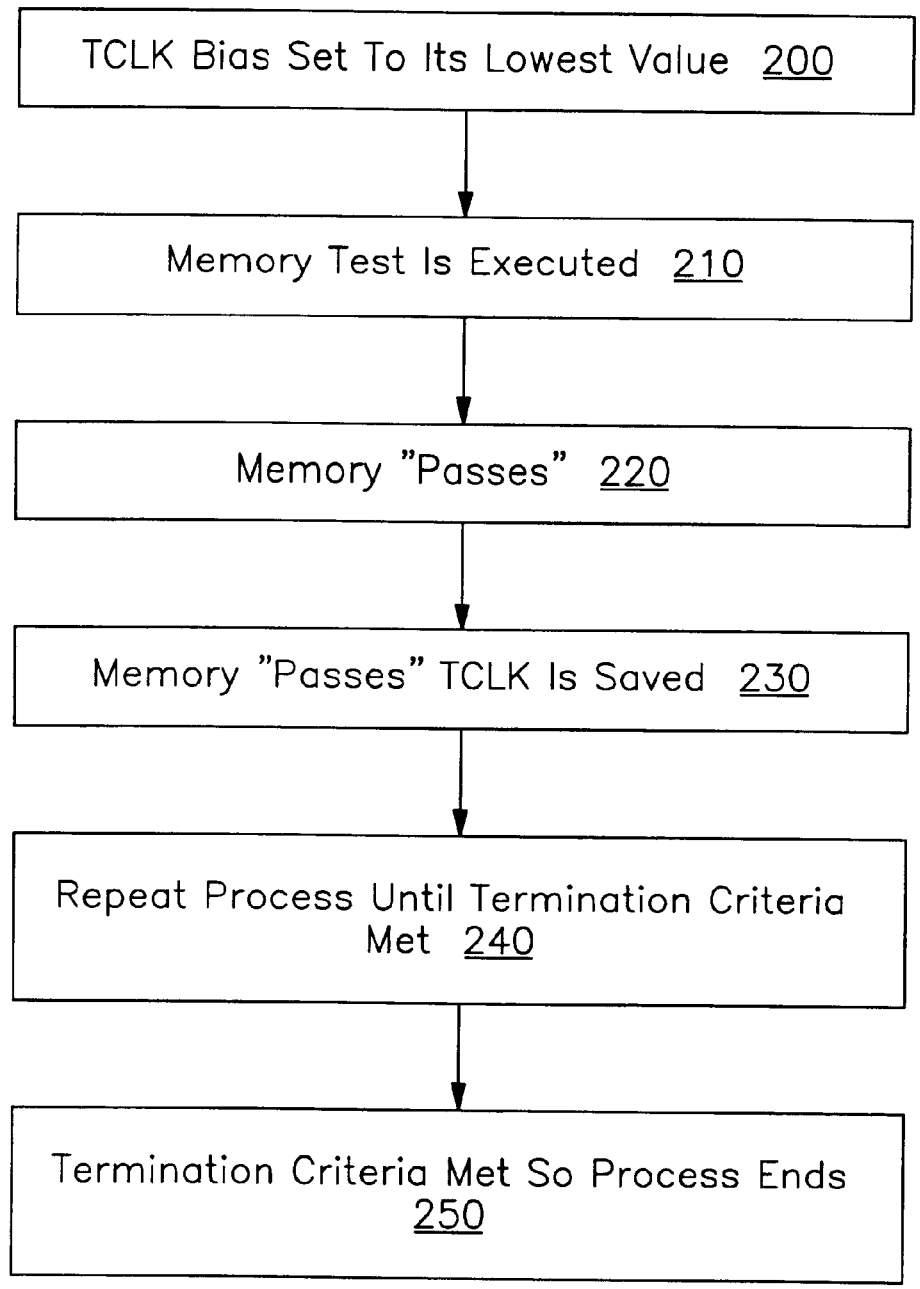
FIG. 3 is a flow chart illustrating TCLK register in accordance with one embodiment of the invention.

FIG. 3 illustrates one embodiment of the invention wherein TCLK bias is set to its lowest value and RCLK is set to zero bias at operation 200. At operation 210, a 10-kilobyte memory test is executed using the values that have been established by the program logic implementing techniques of one embodiment of the invention. At operation 220, one feature of the program logic used herein is that if the "memory passes" (e.g., if the first data sent from MCH 20 to storage device 80 and the second data sent from storage device 80 to MCH 20 is such that the second data is considered "good") then at operation 230 the "memory passing" is saved into storage device 80. "Memory passing" is the value assigned data that is "good" or not "good". Data that is considered "good" is assigned the value of "1" and data that is not "good" is assigned the value of "0". In this manner, Matrix 1 and Matrix 2 described below are filled with "1"'s or "0"'s which in turn determines the optimum RCLC and TCLK times. The lowest passing value is referred to as TCLK_pass_low and the highest passing value is referred to as TCLK_pass_high. At operation 240, this process is repeated for all TCLK bias values. It will be appreciated that the values change as the TCLK bias is changed to a lowest value different than previous TCLK values or substantially all TCLK bias values. This allows a matrix such as that shown in Matrix 1 to be completely filled in as in Matrix 2. The TCLK bias value is then set at the TCLK value that is closest to (TCLK_pass_high+TCLK_pass_low)/2. At operation 250, the process is terminated when a termination criterion or criteria is met. The termination criterion or criteria is established by either a user or a system designer. It will be appreciated that the RCLK adjustment is a dynamic process. Accordingly, the RCLK adjustment and the TCLK adjustment described below may be started every millisecond or other time period that a system is operating. Additionally, it will be appreciated that the RCLK adjustment and the TCLK adjustment may occur at about the same time.

RCLK Adjustment

Figure 4:
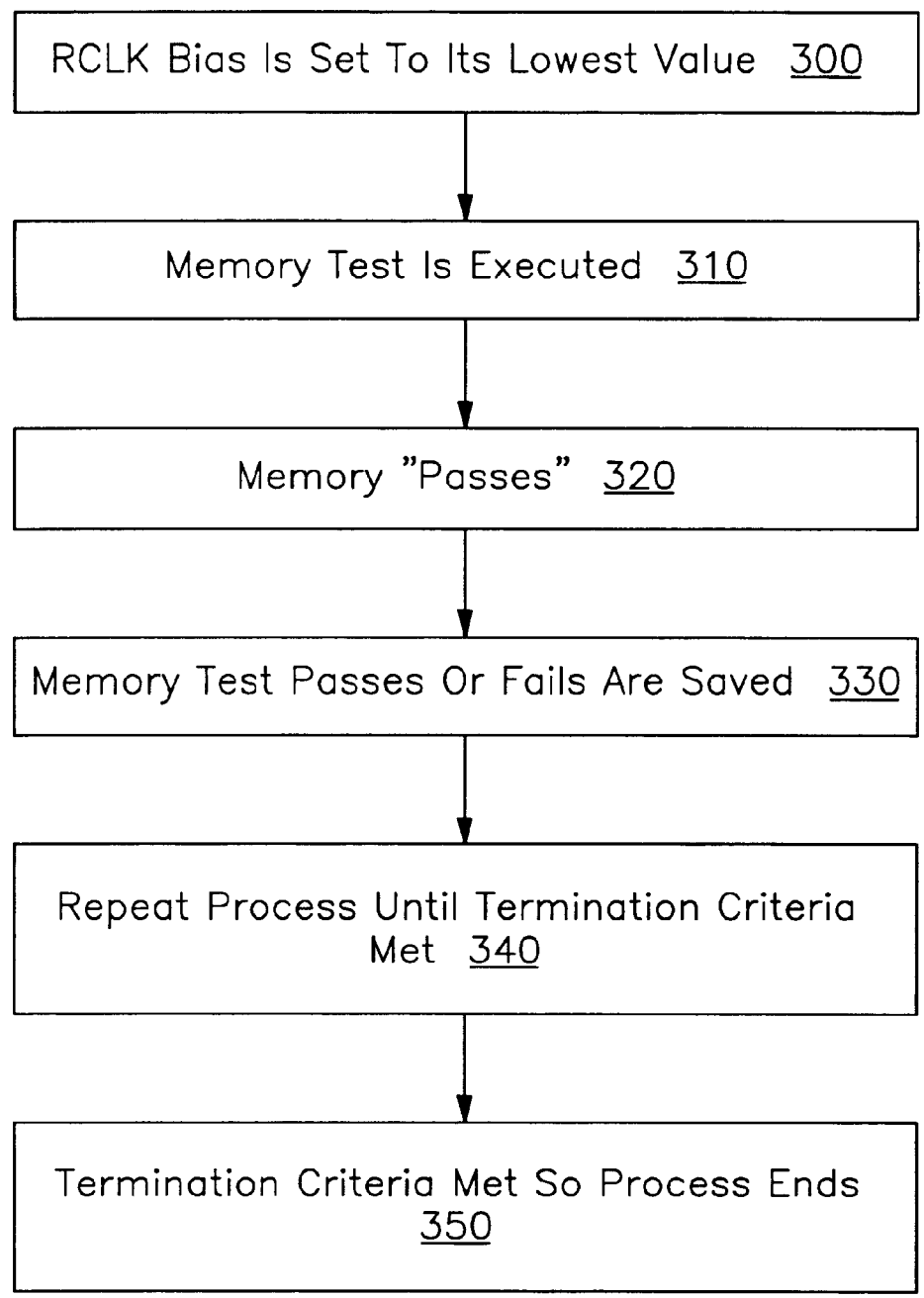
FIG. 4 is a flow chart illustrating RCLK register in accordance with one embodiment of the invention.

FIG. 4 shows one embodiment of the invention for performing a RCLK adjustment. The adjustment of the value for RCLK is similar to the process used to adjust the TCLK. It will be appreciated that RCLK bias may be set at any value but for purposes of illustration, RCLK bias is set to its lowest value at operation 300. For example, TCLK may also be set at any value indicated in Matrix 1. At operation 310, a 10-kilobyte memory test is then executed using the value established for RCLK and TCLK.

At operation 320, the feature of the program logic used herein is that if the "memory passes" (e.g., if the first data sent from the MCH 20 to the storage device 80 and the second data sent from the storage device 80 to the MCH 20 match), then the second data is considered good. Then at operation 330, the "passing" value of "1" is saved into memory provided that the RCLK value in the register is higher or lower than a previous value in which memory passed.

The lowest passing value is referred to as RCLK_pass_low and the highest passing value is referred to as RCLK_pass_high. It will be appreciated that these values change as the RCLK bias is changed to a lowest value different than previous RCLK bias values. At operation 340, the process is repeated until the termination criteria is met. At operation 350, the termination criteria is met and the process is terminated.

It will be appreciated by those skilled in the art that although Matrix 1 shown below is a 5×5 matrix, other sizes of matrices may be used depending upon the number of TCLK bias values or RCLK bias values that are used in the computer program. It will also be appreciated that memory tests other than the 10-kilobyte memory test may be used.

In order to better understand the features of the techniques described herein, provided below is an example of a 5×5 matrix that is used in determining the optimum RCLK and TCLK. Matrix 1 is empty to show that the process has not yet begun.

Matrix 1 Represents the RCLK of Clock 1 and the TCLK of Clock 2 in Picoseconds

|        | Clock 1 |     |   |    |     |
|--------|---------|-----|---|----|-----|
| Clock 2 | −100   | −50 | 0 | 50 | 100 |
| −100   |         |     |   |    |     |
| −50    |         |     |   |    |     |
| 0      |         |     |   |    |     |
| 50     |         |     |   |    |     |
| 100    |         |     |   |    |     |

For purposes of illustration, assume that five clock 1 values and five clock 2 values exist. For both clock 1 and clock 2, the five values are each −100, −50, 0, 50, 100 ps. Accordingly, 25 combinations exist for clock 1 and clock 2. For clock 1, 100 ps means that the data is transmitted 100 ps earlier than usual. For clock 2, −100 ps means that the data receive window is shifted to 100 ps earlier. Clock 1 and clock 2 are then set to −100 ps. In this example, a first data is then sent from MCH 20 to storage device 80 and stored in a buffer. A second data is then sent back from the buffer to MCH 20. Processor 30 then checks the second data that was sent from storage device 80 and compares it to the data that MCH 20 first sent to storage device 80. If the first data returned from MCH 20 is "good" such that it matches the data that was initially sent from MCH 20 to storage device 80, a "1" is stored in the 5×5 matrix cell for −100 ps for clock 1 and clock 2, respectively. If the data is not "good", a "0" is stored. Clock 1 is then changed to −50 ps and the transmit receive and check cycle is repeated. Eventually, Matrix 1 is completely filled out as shown in Matrix 2.

Matrix 2 for RCLK of Clock 1 and TCLK of Clock 2 in Picoseconds

|         | Clock 1 |     |   |    |     |
|---------|---------|-----|---|----|-----|
| Clock 2 | −100    | −50 | 0 | 50 | 100 |
| −100    | 0       | 0   | 0 | 0  | 0   |
| −50     | 0       | 0   | 0 | 0  | 0   |
| 0       | 0       | 0   | 1 | 1  | 1   |
| 50      | 0       | 0   | 1 | 1  | 1   |
| 100     | 0       | 0   | 1 | 1  | 1   |

Since the range of "good" data is zero to 100 for both clock 1 and clock 2, clock 1 may be set to 50 and clock 2 may be set to 50 and one cycle of one embodiment of the invention is complete. This process is repeated until the entire matrix is completely filled.

Worst Case Data Patterns Are Performed During A Read Or Write Cycle

In order to determine the boundaries of the data that "pass", the data that fails should be determined. Worst case data patterns may be determined during a read cycle or a write cycle by trying various values for RCLK and TCLK as described above. Data that does not "pass" is assigned a zero as mentioned above. Practical experience indicates that the following pattern generally provides the worst case data patterns "101010". It is to be appreciated that other data patterns may constitute the worst case data pattern in different system configurations by providing the least amount of timing margin.

Figure 5:
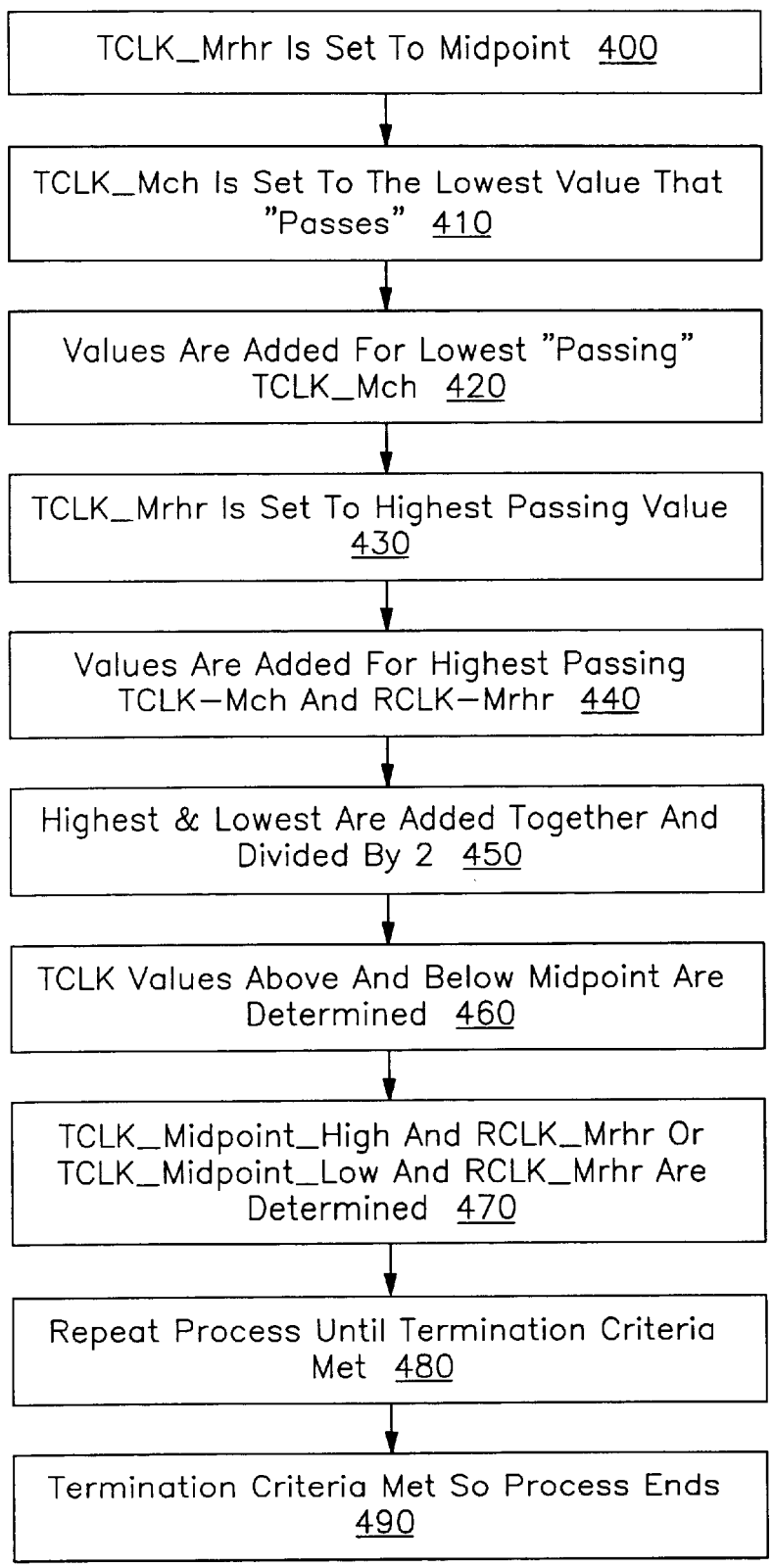
FIG. 5 illustrates a flow chart in accordance with one embodiment of the invention.

FIG. 5 illustrates another embodiment of the invention in the form of a flow chart and is similar to the embodiments shown in FIGS. 3 and 4. In this embodiment of the invention, two TCLK and two RCLK on MCH must be determined after data is sent between MCH and memory repeater hub rambus ("MRHR"). As noted above, the data is checked in a similar fashion as described above except at least two Rambus channels are involved such as that which is illustrated in FIG. 10B. At operation 400, the TCLK-mrhr is set to the midpoint such as zero ps. At operation 410, the TCLK_mch is set to the lowest value that "passes." The lowest value of TCLK "passes" when the first data sent from MCH 20 to memory repeater hub rambus ("MRHR") and the second data sent from MRHR to MCH 20 is such that the second data is considered "good" (e.g., the second data matches the first data). Starting with the RCLK_mrhr value high, the RCLK_mrhr is decreased until there is a failure or the limit as to that which is designated as "good" is met. At operation 420, the values of RCLK_mrhr value high and RCLK_mrhr are added for the lowest passing TCLK_mch (in picoseconds) and RCLK_mrhr (in picoseconds) together, and that sum is stored in storage device 80. At operation 430, the TCLK_mch is set to the highest passing value.

Starting with the lowest RCLK_mrhr value, the RCLK_mrhr value is increased until there is a failure or the limit of that which is deemed "good" is achieved. At operation 440, the values are added for the highest passing TCLK_mch (in picoseconds) and the RCLK_mrhr (in picoseconds) which were increased. The sum for that addition is stored in storage device 80. At operation 450, the highest and lowest values are added together and divided by two to get the midpoint. At operation 460, the TCLK values above and below the midpoint are determined. At operation 470, values of TCLK_midpoint_high and RCLK_mrhr or TCLK_midpoint_low and RCLK_mrhr are determined given the value closest to the midpoint. At operation 480, the procedure is repeated using the values established and described above for TCLK_mrhr and RCLK_mch. At operation 490, the termination criteria is met and the process is ended until the process is automatically restarted.

Figure 6:
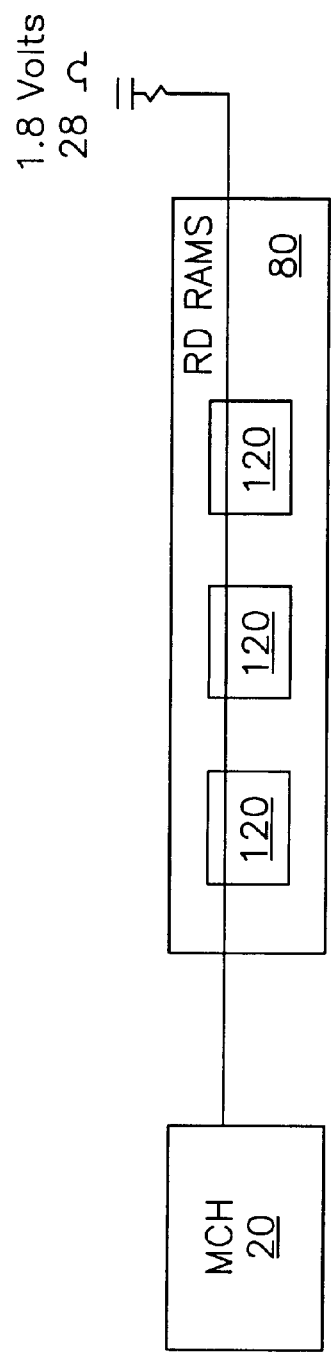
FIG. 6 is a block diagram illustrating the memory in connection with the memory hub controller in accordance with one embodiment of the invention.
Figure 7:
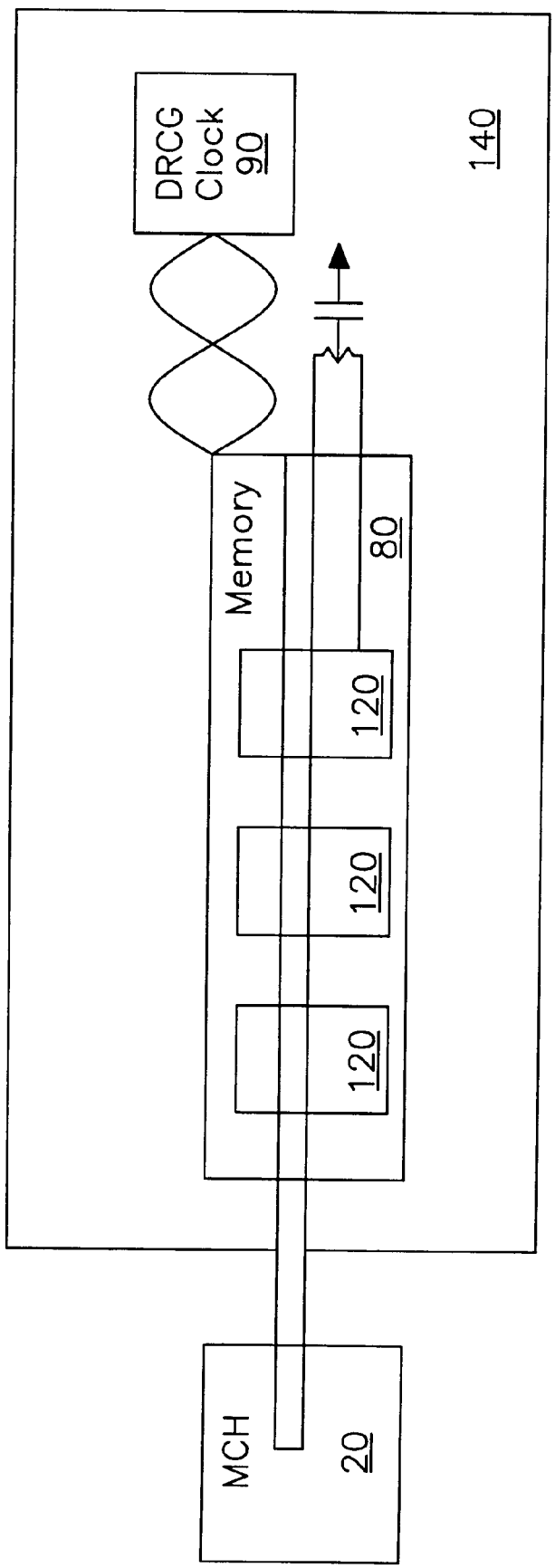
FIG. 7 is a graphic representation of the clock pulse generated by the DRCG chip on the system board in accordance with one embodiment of the invention.

FIGS. 6–9 show in greater detail schematic illustrations of the clock pulses and signals emitted from DRCG 90. FIGS. 6 and 7 are block diagrams that show the clock pulses being emitted from DRCG clock 90. FIG. 6 is a block diagram illustrating storage device 80 in connection with MCH 20 in accordance with one embodiment of the invention. MCH 20 has data lines that enters storage device 80. The data line also enters RDRAM 120. It will be appreciated that RDRAM may comprise up to 32 RDRAM. It will also be appreciated that storage device 80 includes a clock with a clock signal generally of a sine wave that is a differential of two clock signals in which one of the clock signals is high and the other clock signal is low. The sine wave occurs at the backside of RDRAM. FIG. 7 illustrates the same block diagram as FIG. 6 except FIG. 7 further shows the alternating sine waves being emitted from DRCG clock 90.

Figure 8:
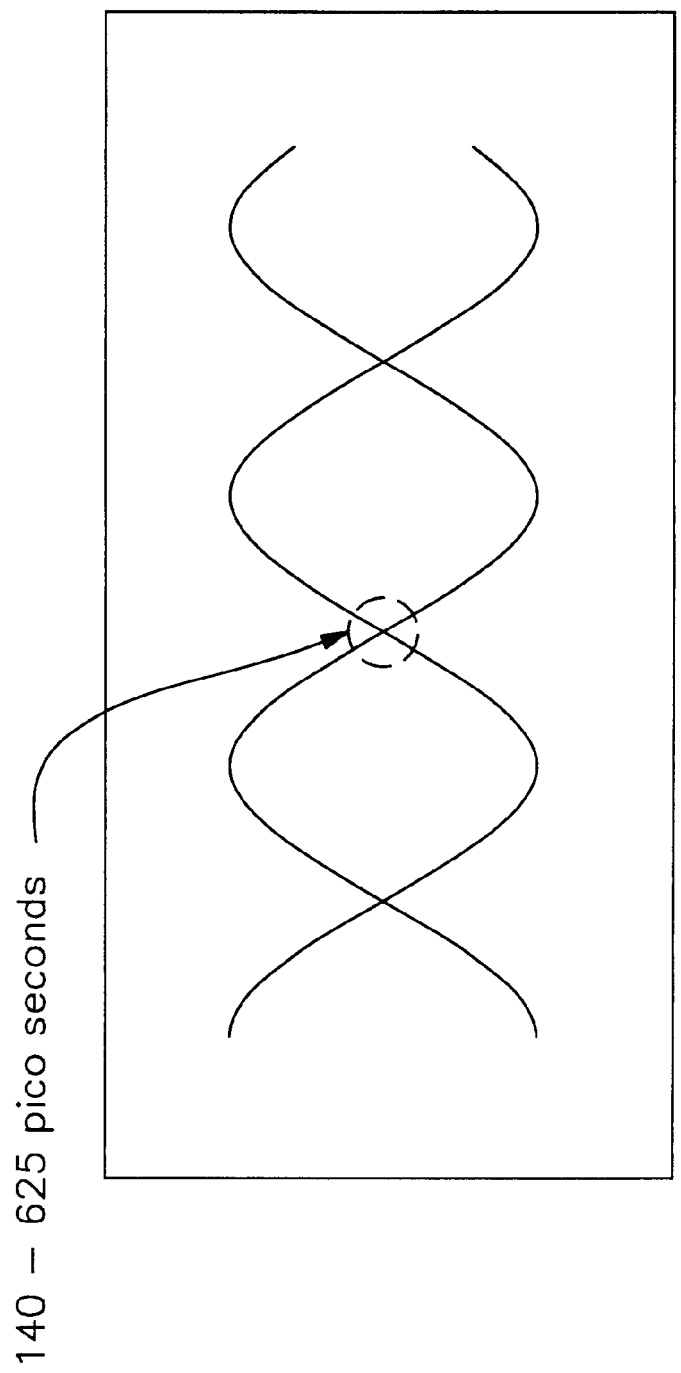
FIG. 8 shows a differential sine wave at 180 degree phase in which data is launched in accordance with one embodiment of the invention.
Figure 9:
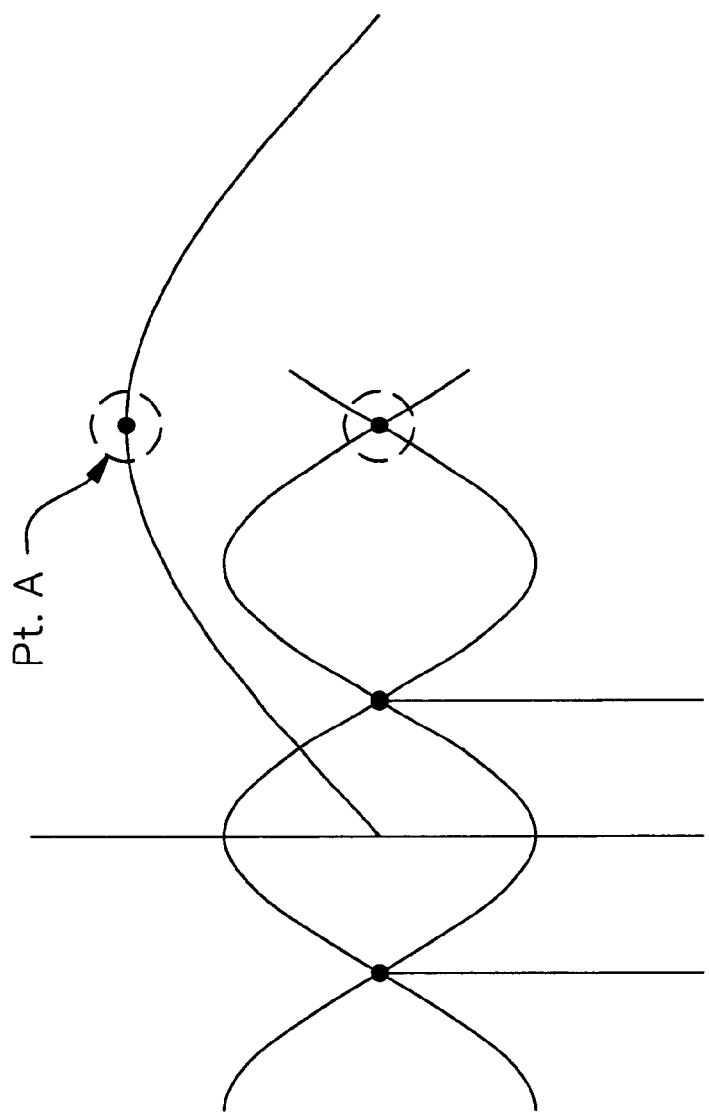
FIG. 9 shows clock pulses in which data is launched in accordance with one embodiment of the invention.

FIG. 8 illustrates a clock pulse generated by the DRCG clock on the system board 10 in accordance with one embodiment of the invention. At clock crossing 140 which is, for example, 625 ps, data is launched. FIG. 9 illustrates a clock pulse and point A wherein data is launched 625 ps after the clock crossing occurs.

Figure 10A:
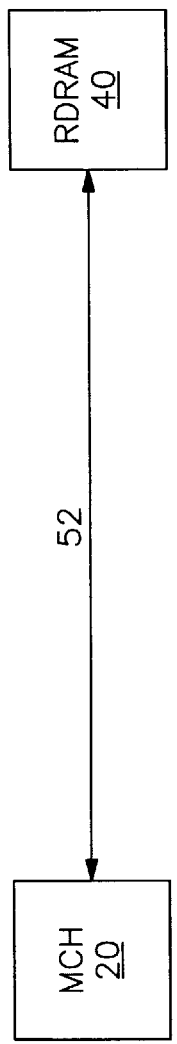
FIG. 10A illustrates a memory controller hub connected to a direct channel.
Figure 10B:
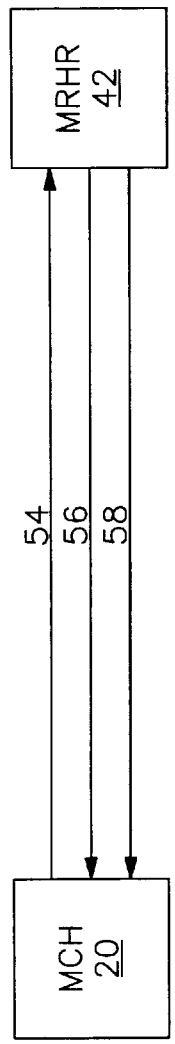
FIG. 10B illustrates a memory controller hub connected to a plurality of channels.
Figure 10C:
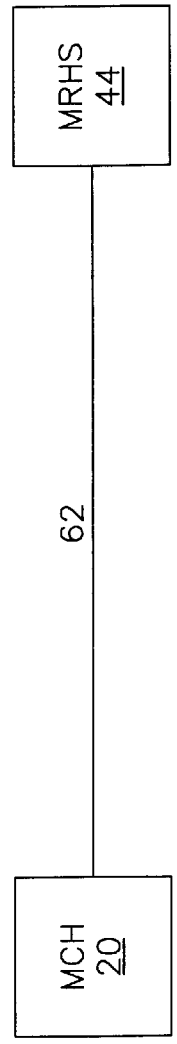
FIG. 10C illustrates a memory controller hub connected to a channel.

FIGS. 10A–10C illustrates various embodiments of the invention wherein one or more channels are used in connection with MCH 20. FIG. 10A illustrates MCH 20 coupled to RDRAM by direct channel 52. In this embodiment of the invention, only one TCLK and RCLK must be adjusted. Adjusting the RCLK and the TCLK on MCH 20 may be problematic when MCH 20 is coupled to RDRAM because it may not properly work with each RDRAM. In this embodiment, the RCLK and TCLK for MCH 20 are set to zero and the TCLK and the RCLK may be adjusted for each individual RDRAM.

FIG. 10B illustrates MCH 20 coupled to MRHR 42 by two direct channels (56, 58) that exit MRHR 42 and enter MCH 20, and channel 54 exits MCH 20 and enters MRHR 42. In this embodiment of the invention, three channels each have a TCLK and RCLK that may be adjusted. By having a plurality of channels, the computer system is capable of generally operating faster and more efficiently because more data can be processed on more channels.

FIG. 10C illustrates MCH 20 coupled to memory repeater hub SDRAM (MRHS) 44 by direct channel 62. Direct channel 62 has one TCLK and one RCLK that may be adjusted.

FIG. 11 illustrates another embodiment of the invention in which voltage reference ($V_{reference}$) is adjusted. In this embodiment, the TCLK and the RCLK have been adjusted on MCH 20 and the TCLK and the RCLK have been adjusted on storage device 80 (or other suitable device) and the voltage reference ($V_{reference}$) for DRCG clock 90 is automatically adjusted to its optimum value. The clock crossing is where data is sampled. It will be appreciated that the high voltage ($V_{high}$) is at 1.8 volts and the low voltage ($V_{low}$) is at 1.0 volts and the $V_{reference}$ is set, for example, at 1.4. The $V_{reference}$ is used to determine the high and low voltages. $V_{reference}$ may be adjusted up or down. In this embodiment, the first current from MCH 20 is determined when a first data is sent to storage device 80. A second current is determined when a second data is sent from storage device 80 to MCH 20. If the second current matches the first current, the current "passes" and a "1" is assigned to the "pass" and is stored in storage device 80. If the second current does not match the first current, the current "fails" and a "0" is assigned to the "fail" and is "0" a stored in storage device 80. A matrix similar to Matrix 1 is completed to a matrix similar to Matrix 2. The techniques of the claimed invention described herein are implemented to determine the scope of that which is "good" data. Therefore, by implementing techniques described herein, the optimum $V_{reference}$ is determined.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. A method comprising:
    allowing a processor to execute instructions for improving a timing margin in a first integrated circuit (IC) die under test, wherein the execution
        (a) instructs the first IC die to set a relative phase of receive and reference clock signals at the first IC die, from a plurality of discrete, receive phase values,
        (b) instructs the first IC die to set a relative phase of transmit and reference clock signals at the first IC die, from a plurality of discrete, transmit phase values,
        (c) instructs the first IC die to drive a sequence of outgoing data symbols according to the transmit clock and receive a sequence of incoming data symbols according to the receive clock, at the relative phase settings of (a) and (b), and compares the outgoing symbols to the incoming symbols, and then
        (d) repeats (a)–(c) for other combinations of said plurality of transmit and receive phase values, and then
        (e) sets the relative phases, to values which are closest to yielding a balanced timing margin as determined from the results of the comparisons.

2. The method of claim 1 wherein the plurality of discrete, transmit phase values are predetermined positive and negative clock bias numbers with respect to a zero clock bias.

3. The method of claim 2 further comprising:
    allowing the processor to execute further instructions to repeat (a)–(c) for all other combinations of said plurality of transmit and receive phase values, prior to (e).

4. An article of manufacture comprising:
    a machine-readable medium having instructions stored therein which, when executed by a processor, control a timing margin in an electronic system having first and second integrated circuit (IC) dies coupled to each other, the first IC die to drive a transmission line signal with a sequence of outgoing data symbols according to a transmit clock signal which is synchronized to a distributed clock signal, the first IC die to sample a transmission line signal to obtain a sequence of incoming data symbols according to a receive clock signal which is synchronized to the distributed clock signal, wherein execution of the instructions
        (a) sets a relative phase of the receive and the distributed clock signals, from a plurality of discrete, receive phase values,
        (b) sets a relative phase of the transmit and the distributed clock signals, from a plurality of discrete, transmit phase values,
        (c) instructs the first IC die to drive the sequence of outgoing data symbols and receive the sequence of incoming data symbols, at the relative phase settings of (a) and (b), compares the outgoing symbols to the incoming data symbols and records a result of the comparison, and then
        (d) repeats (a)–(c) for other combinations of said plurality of discrete, transmit phase values and discrete, receive phase values, and then
        (e) sets the relative phases, as in (a) and (b), to a pair of values, from said plurality of discrete, transmit and receive phase values, which are closest to yielding a balanced timing margin as determined from the results of the comparisons.

5. The article of manufacture of claim 4 wherein the machine-readable medium includes further instructions which, when executed by the processor, store the results of the comparisons in an array of variables each to be assigned one of a pass value and a fail value, wherein a pass means that the sequences of incoming and outgoing symbols substantially match and a fail means that they do not, and wherein each variable refers to the result of a comparison for a different pair of said plurality of discrete, receive and transmit phase values.

6. The article of manufacture of claim 5 wherein the machine-readable medium includes further instructions which, when executed by the processor, determine the largest timing margin by computing an average of the highest and lowest passing, discrete, transmit phase values, and an average of the highest and lowest passing, discrete, receive phase values in the array.

7. An electronic system comprising:
    first and second integrated circuit (IC) dies coupled to each other via one or more data transmission lines, and a processor coupled to access the first and second IC dies, the first IC die to drive a transmission line signal, in one of the transmission lines, with a sequence of outgoing data symbols according to a transmit clock signal, the first IC die to derive the transmit clock signal from a distributed clock signal, which is distributed to the first and second IC dies, the first IC die to repeatedly sample a transmission line signal, from one of the transmission lines, to obtain a sequence of incoming data symbols according to a receive clock signal, the first IC die to derive the receive clock signal from the distributed clock signal, wherein the first IC die is to adjust (1) a relative phase of the transmit and distributed clock signals and (2) a relative phase of the receive and distributed clock signals, according to values stored in the first IC die and determined by the processor executing a program that evaluates data transfers between the first and second IC dies to obtain the values as yielding largest average timing margin for the data transfers.

8. The electronic system of claim 7 further comprising a clock signal generator coupled to provide the first and second IC dies with the distributed clock signal via a pair of parallel traces formed in a printed wiring board and to which an external clock input of the first die is connected.

9. The electronic system of claim 8 further comprising a termination circuit, wherein the clock signal generator is coupled to one end of the pair of traces and the termination circuit is coupled to another end of the pair of traces, and wherein the pair of traces is looped through the second IC die.

10. The electronic system of claim 9 wherein the distributed clock signal is provided to the driver timing circuitry and to the receiver timing circuitry from upstream and downstream locations, respectively, on the pair of traces.

11. The electronic system of claim 7 wherein the first IC die includes a dynamic random access memory storage array and the second IC die includes a memory controller.

12. The electronic system of claim 7 wherein the first IC die includes a memory repeater and the second IC die includes a memory controller.

13. A method comprising:

allowing a processor to execute instructions for improving a timing margin in first and second integrated circuit (IC) dies, wherein the execution (a) sets a relative phase of receive and distributed clock signals at the first IC die, from a plurality of discrete, first receive phase values, (b) sets a relative phase of receive and distributed clock signals at the second IC die, from a plurality of discrete, second receive phase values, (c) instructs the second IC die to receive a sequence of outgoing data symbols according to the receive clock and the first IC die to receive a sequence of incoming data symbols according to the receive clock, at the relative phase settings of (b) and (a), respectively, and compares the outgoing symbols to the incoming symbols, and then (d) repeats (a)–(c) for other combinations of said plurality of first and second receive phase values, and then (e) sets the relative phases, as in (a) and (b), to values which are closest to yielding a balanced timing margin as determined from the results of the comparisons.

14. The method of claim 13 wherein the plurality of discrete, first and second receive phase values are predetermined positive and negative clock bias numbers with respect to a zero clock bias.

15. A method comprising:

allowing a processor to execute instructions for improving a timing margin in first and second integrated circuit (IC) dies, wherein the execution (a) sets a relative phase of transmit and distributed clock signals at the first IC die, from a plurality of discrete, first transmit phase values, (b) sets a relative phase of transmit and distributed clock signals at the second IC die, from a plurality of discrete, second transmit phase values, (c) instructs the first IC die to drive a sequence of outgoing data symbols according to the transmit clock and the second IC die to drive a sequence of incoming data symbols according to the transmit clock, at the relative phase settings of (a) and (b), respectively, and compares the outgoing symbols to the incoming symbols, and then (d) repeats (a)–(c) for other combinations of said plurality of first and second transmit phase values, and then (e) sets the relative phases, as in (a) and (b), to values which are closest to yielding a balanced timing margin as determined from the results of the comparisons.

16. The method of claim 15 wherein the plurality of discrete, first and second transmit phase values are predetermined positive and negative clock bias numbers with respect to a zero clock bias.

* * * * *

UNITED STATES PATENT AND TRADEMARK OFFICE
CERTIFICATE OF CORRECTION

PATENT NO. : 6,647,507 B1
DATED : November 11, 2003
INVENTOR(S) : Dow

It is certified that error appears in the above-identified patent and that said Letters Patent is hereby corrected as shown below:

Column 2,
Line 33, delete "Controller", insert -- MCH --.
Line 34, before "MCH 20", delete "memory", Column 3,
Line 58, delete "is", insert -- are --.

Signed and Sealed this

Second Day of March, 2004

JON W. DUDAS
*Acting Director of the United States Patent and Trademark Office*